United States Patent
Hashida

[11] Patent Number: 5,948,990
[45] Date of Patent: Sep. 7, 1999

[54] PRESSURE-SENSITIVE RESISTOR

[75] Inventor: Junji Hashida, Miyagi-ken, Japan

[73] Assignee: Alps Electric Co., Ltd., Tokyo, Japan

[21] Appl. No.: 08/918,035

[22] Filed: Aug. 25, 1997

[30] Foreign Application Priority Data

Sep. 4, 1996 [JP] Japan ..................... 8-234396

[51] Int. Cl.⁶ .............. G01L 9/02; H01C 10/10
[52] U.S. Cl. .............................. 73/725; 338/114
[58] Field of Search .................. 73/725, 726, 728, 73/720, 719, 779, 862.01, 862.04, 862.55, 862.66, 862.68; 338/2, 3, 4, 5, 7, 36, 37, 38–47, 13, 71, 99, 114

[56] References Cited

U.S. PATENT DOCUMENTS

| | | | |
|---|---|---|---|
| 3,808,678 | 5/1974 | Kubo et al. ................................ | 338/2 |
| 4,163,204 | 7/1979 | Sado et al. ............................... | 338/114 |
| 4,203,088 | 5/1980 | Sado et al. ............................... | 338/114 |
| 4,210,895 | 7/1980 | Sado et al. ............................... | 338/114 |
| 4,314,227 | 2/1982 | Eventoff .................................. | 338/114 |
| 4,322,983 | 4/1982 | Sado ........................................ | 338/114 |
| 4,489,302 | 12/1984 | Eventoff .................................. | 338/114 |
| 4,640,137 | 2/1987 | Trull et al. ............................. | 338/114 |
| 4,763,534 | 8/1988 | Hager ...................................... | 73/862.01 |
| 4,793,193 | 12/1988 | Borgudd ............................... | 73/862.04 |
| 4,794,366 | 12/1988 | Sakamoto .................................. | 338/114 |
| 4,847,586 | 7/1989 | Tanaga et al. ........................... | 338/114 |
| 4,914,416 | 4/1990 | Kunikane ................................ | 338/114 |
| 4,996,511 | 2/1991 | Ohkawa et al. ........................ | 338/114 |
| 5,311,779 | 5/1994 | Teruo ....................................... | 73/726 |
| 5,455,556 | 10/1995 | Ohm et al. .............................. | 338/114 |

FOREIGN PATENT DOCUMENTS 3-144329  6/1991  Japan .

*Primary Examiner*—Harshad Patel
*Assistant Examiner*—Robin Clark
*Attorney, Agent, or Firm*—Brinks Hofer Gilson & Lione

[57] ABSTRACT

The present invention relates to a pressure-sensitive resistor in which the resistance between two electrode patterns varies in response to applied pressure, wherein the desired pressure-sensitive characteristics of the resistor can be readily achieved by appropriately adjusting the degree of the planar-positional difference between the two electrode patterns. This pressure-sensitive resistor comprises two insulating substrates, each one of which has an opposing surface facing the other substrate, and at least one of which is flexible; and at least one pressure-sensitive module which comprises a pressure-sensitive conductor disposed between said insulating substrates and having a predetermined electrical resistance in directions along the surfaces of said insulating substrates, and two electrode patterns situated between at least one of said insulating substrates and said pressure-sensitive conductor, wherein said two electrode patterns are formed on at least one of the opposing surfaces of said two insulating substrates so as not to overlap with each other in plan view. When this pressure-sensitive resistor is pressed, the contact resistances between the electrode patterns and the pressure-sensitive conductor is altered in accordance with the applied pressing force.

11 Claims, 6 Drawing Sheets

PRESSURE-SENSITIVE RESISTOR

BACKGROUND OF THE INVENTION

1. Field of the Invention

The present invention relates to a pressure-sensitive resistor which has a pressure-sensitive conductor, and which detects pressures based on contact-resistance variations in accordance with the applied pressure.

2. Description of the Related Art

Hitherto, pressure-sensitive resistors are widely used in various pressure sensors, keyboard switches, automatic-door switches, and pressure-contact switches.

FIG. 11 is a diagram showing a conventional pressure-sensitive resistor.

In FIG. 11, the numeral 50 indicates an upper film, 51 indicates an lower film, 52 indicates an Ag electrode pattern formed on the lower film 51, 53 indicates an Ag electrode pattern formed on the upper film 50 so as to oppose the Ag electrode pattern 52, and 54 indicates a pressure-sensitive conductor formed on the Ag electrode pattern 53 by application. Here, the lower film 51 and upper film 50 are disposed such that the Ag electrode pattern 52 can come into contact with the pressure-sensitive conductor 54.

The pressure-sensitive conductor 54 is formed with an elastomer comprising an insulating rubber material, and conductive particles mixed therein. Accordingly, when the pressure-sensitive conductor 54 is pressed, the intervals between the conductive particles in the pressure-sensitive conductor 54 are narrowed, and the resistance of the conductor is lowered. In summary, the pressure-sensitive conductor 54 exhibits the pressure-sensitive characteristics in which the resistance decreases relative to an increase in applied pressure.

In such a conventional pressure-sensitive resistor, when the upper film 50 is pressed, the pressure-sensitive conductor 54 situated between a pair of the Ag contacting patterns 52 and 53 is compressed. At this time, the resistance can be detected by a pair of the Ag contacting patterns 52 and 53, and the applied pressure corresponding to the resistance can be read from a graph showing the pressure sensitivity characteristics.

In the meantime, in conventional pressure-sensitive resistors, their pressure-sensitive characteristics are determined depending on the material of the pressure-sensitive conductor. Accordingly, when pressure-sensitive resistors respectively having different pressure-sensitive characteristics (pressure-resistance characteristics) should be produced, the materials for their pressure-sensitive conductors must be altered. Due to this, obtaining various pressure-sensitive resistors of various pressure-sensitive characteristics has been difficult.

Further, although printing is preferred to form a pressure-sensitive conductor in view of cost-saving, desired pressure-resistance characteristics can rarely be achieved by printing since the pressure-resistance characteristics of the pressure-sensitive conductor vary depending on its thickness.

SUMMARY OF THE INVENTION

A first object of the present invention is to provide a pressure-sensitive resistor, the desired pressure-sensitive characteristics of which can readily be achieved by appropriately designing electrode patterns.

A second object of the present invention is to provide a pressure-sensitive resistor, the desired pressure-sensitive characteristics of which can also readily be achieved by appropriately adjusting the amount of the projecting portions of insulating particles included in the resistor, namely, can be selected from among further-increased variations.

A third object of the present invention is to provide a pressure-sensitive resistor, the manufacturing process of which can be simplified, and the pressure-sensitive characteristics of which in an early stage of an application of pressure can be further freely selected.

A fourth object of the present invention is to provide a pressure-sensitive resistor which can be manufactured by a simplified manufacturing process restraining irregularity in pressure-sensitive characteristics.

A fifth object of the present invention is to provide a pressure-sensitive resistor, the desired pressure-sensitive characteristics of which can be achieved by appropriately adjusting the degree of the planar-positional difference between the two electrode patterns. Further, such desired pressure-sensitive characteristics of the resistor can also be achieved by appropriately adjusting the amount of the projecting portions of insulating particles, namely, can be selected from among further-increased variations. Further, the resistor can be manufactured according to a simplified process.

A sixth object of the present invention is to provide a pressure-sensitive resistor including a conductive film which can be formed by a simple method such as printing.

A seventh object of the present invention is to provide a pressure-sensitive resistor which can be highly productively manufactured at a lowered cost.

An eighth object of the present invention is to provide a pressure-sensitive resistor which can possess a switching function.

A ninth object of the present invention is to provide a pressure-sensitive resistor which can detect pressure distribution.

The present invention has been accomplished to achieve the above-described objects, and an aspect of the present invention is a pressure-sensitive resistor comprising:

two insulating substrates, each of which has an opposing surface facing the other substrate, and at least one of which is flexible; and at least one pressure-sensitive module which comprises at least one pressure-sensitive conductor disposed between said insulating substrates and having a predetermined electrical resistance (conductive resistance) in directions along the surfaces of said insulating substrates, and two electrode patterns formed on at least one of the opposing surfaces of said two insulating substrates so as not to overlap with each other in plan view.

According to this aspect, since the pressure-sensitive characteristics of the resistor can be adjusted based on the degree of the planar-positional difference between said two electrode patterns, the desired pressure-sensitive characteristics can be readily achieved by appropriately designing the electrode patterns, namely, the aforementioned first object can be achieved.

Further, said at least one pressure-sensitive conductor may be formed on the insulating substrate opposing the insulating substrate having at least one of said electrode patterns, and may comprise a base conductive film (layer) and insulating particles projecting from the conductive film.

According to this manner, the pressure-sensitive characteristics of the resistor can be adjusted also by adjusting the amount of the projecting portions of the insulating particles as well as by adjusting the degree of the planer-positional difference between the electrode patterns. Accordingly, possible variations for the pressure-sensitive characteristics of the resistor can be readily markedly increased, and the aforementioned second object can be achieved.

Moreover, said two electrode patterns may be formed on one of the opposing surfaces of said two insulating substrates, and each of said two electrode patterns may comprise a conductive film (layer) and insulating particles projecting therefrom.

In this case, since said two electrode patterns are formed on one insulating substrate, the manufacturing process can be simplified as compared to the case where two electrode patterns are formed on two insulating substrates one by one. Further, since the electrode patterns and the pressure-sensitive conductor include insulating particles projecting from the conductive films as the bases of the patterns and conductor, the number of parameters concerning the pressure-sensitive characteristics can be increased. In particular, the degree of freedom in selecting the pressure-sensitive characteristics of the resistor in an early stage of an application of pressure can be increased since the desired pressure-sensitive characteristics can also be achieved by respectively adjusting the amounts of the projecting portions of the insulating particles in the patterns and the conductor. Accordingly, the aforementioned third object can be achieved.

Moreover, said two electrode patterns may be simultaneously formed on one of the opposing surfaces of said insulating substrates by printing.

According to this manner, the manufacturing process can be simplified since the two electrode patterns are simultaneously printed on one insulating substrate. Additionally, since the degree of the planar-positional difference between the two electrode patterns is defined based on the accuracy of a mask used in printing and does not alter during assembly, irregularity in pressure-sensitive characteristics between produced resistors due to alteration of the degree of the positional difference during assembly can be restrained. Accordingly, the aforementioned fourth object can be achieved.

Further, another aspect of the present invention is a pressure-sensitive resistor comprising:

two insulating substrates, each one of which has an opposing surface facing the other substrate, and at least one of which is flexible; and at least one pressure-sensitive module which comprises a resistor member (resistive element) disposed between said insulating substrates, and two electrode patterns formed on one of the opposing surfaces of said two insulating substrates so as not to overlap with each other in plan view, wherein each of said electrode patterns comprises a base conductive film (layer) and insulating particles projecting from the film.

According to this aspect, the desired pressure-sensitive characteristics can readily be achieved by appropriately adjusting the planar-positional difference between the two electrode patterns, and also by appropriately adjusting the amount of the projecting portion of the insulating particles in the electrode patterns. Possible variations for the pressure-sensitive characteristics of the resistor can therefore readily be markedly increased. Additionally, since said two electrode patterns are formed on one insulating substrate, the manufacturing process can be simplified as compared to the case where two electrode patterns are formed on two insulating substrates one by one. Accordingly, the aforementioned fifth object can be achieved.

In each of the above-described aspects, the diameters of the insulating particles may be larger than the thickness of the conductive film where said insulating particles are embedded.

In this case, desired conductive films can be formed by a simple method, namely, the aforementioned sixth object can be achieved.

Further, each of said conductive films may be formed by printing using a conductive ink in which insulating particles are dispersed.

According to this manner, the pressure-sensitive resistor can be highly productively manufactured at a lowered cost, namely, the aforementioned seventh object can be achieved.

Moreover, said two insulating substrates may be disposed one upon the other with the intervention of a spacer such that said two electrode patterns oppose said pressure-sensitive conductor at an interval.

According to this structure, the pressure-sensitive resistor can possess a switching function, namely the aforementioned eighth object can be achieved.

Furthermore, said pressure-sensitive resistor may include a plurality of dispersively disposed pressure-sensitive modules each comprising said electrode patterns and said pressure-sensitive conductor.

According to this manner, the pressure-sensitive resistor can be used for detecting pressure distributions, namely, the aforementioned ninth object can be achieved.

DESCRIPTION OF THE PREFERRED EMBODIMENT

Some embodiments according to the present invention will be illustrated below with reference to the attached drawings, FIGS. 1 to 10.

Embodiment 1

Initially, Embodiment 1 of the present invention will be illustrated with reference to FIGS. 1 to 5.

Figure 1:
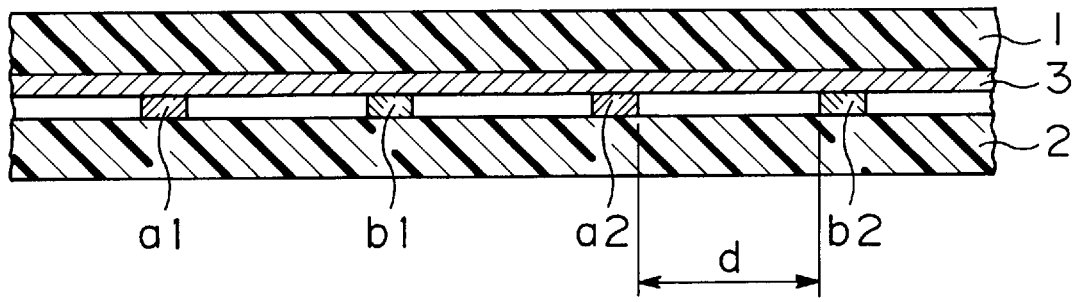
FIG. 1 is a longitudinal sectional view of the principal portion of Embodiment 1 according to the present invention.
Figure 2:
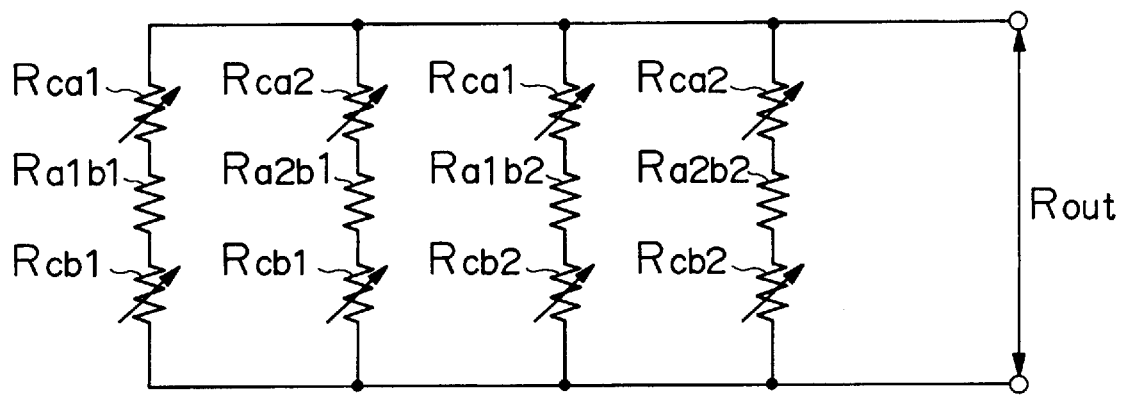
FIG. 2 is an equivalent circuit diagram of Embodiment 1 according to the present invention.
Figure 3A:
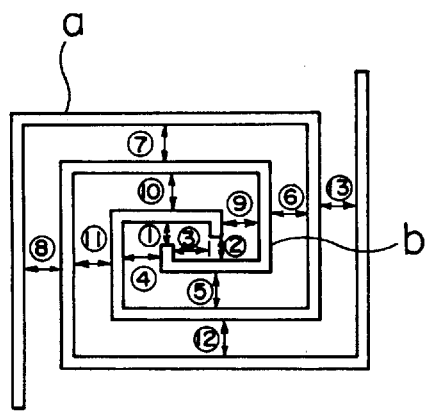
FIGS. 3A and 3B show variations of electrode patterns.
Figure 3B:
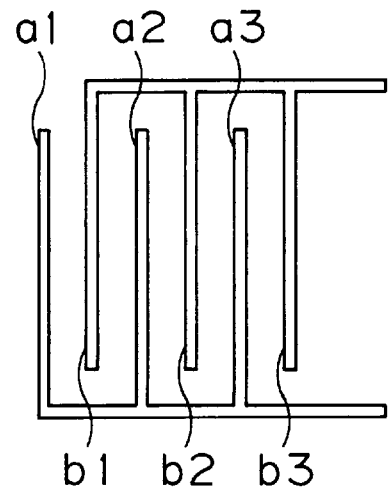
Figure 4A:
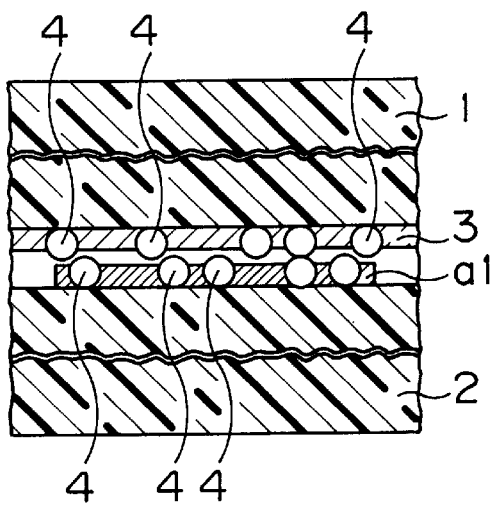
FIGS. 4A, 4B, 4C and 4D microscopically show the operation of the pressure-sensitive resistor of Embodiment 1 according to the present invention.
Figure 4B:
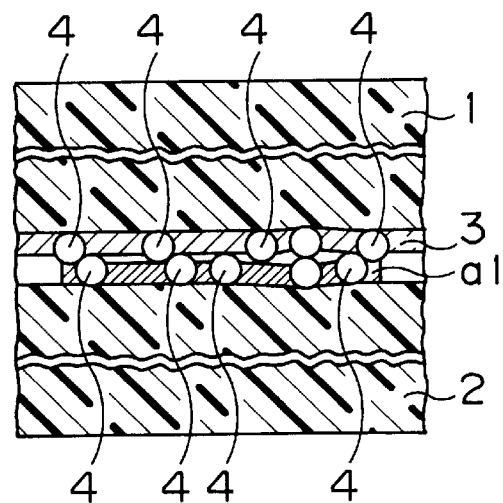
Figure 4C:
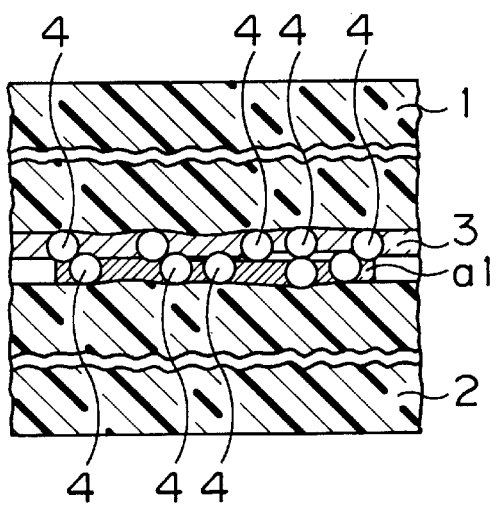
Figure 4D:
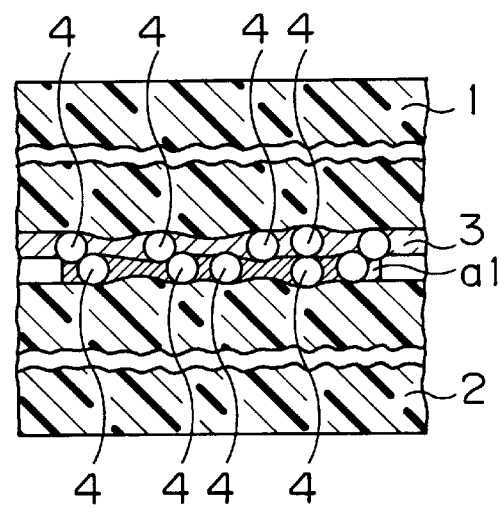
Figure 5:
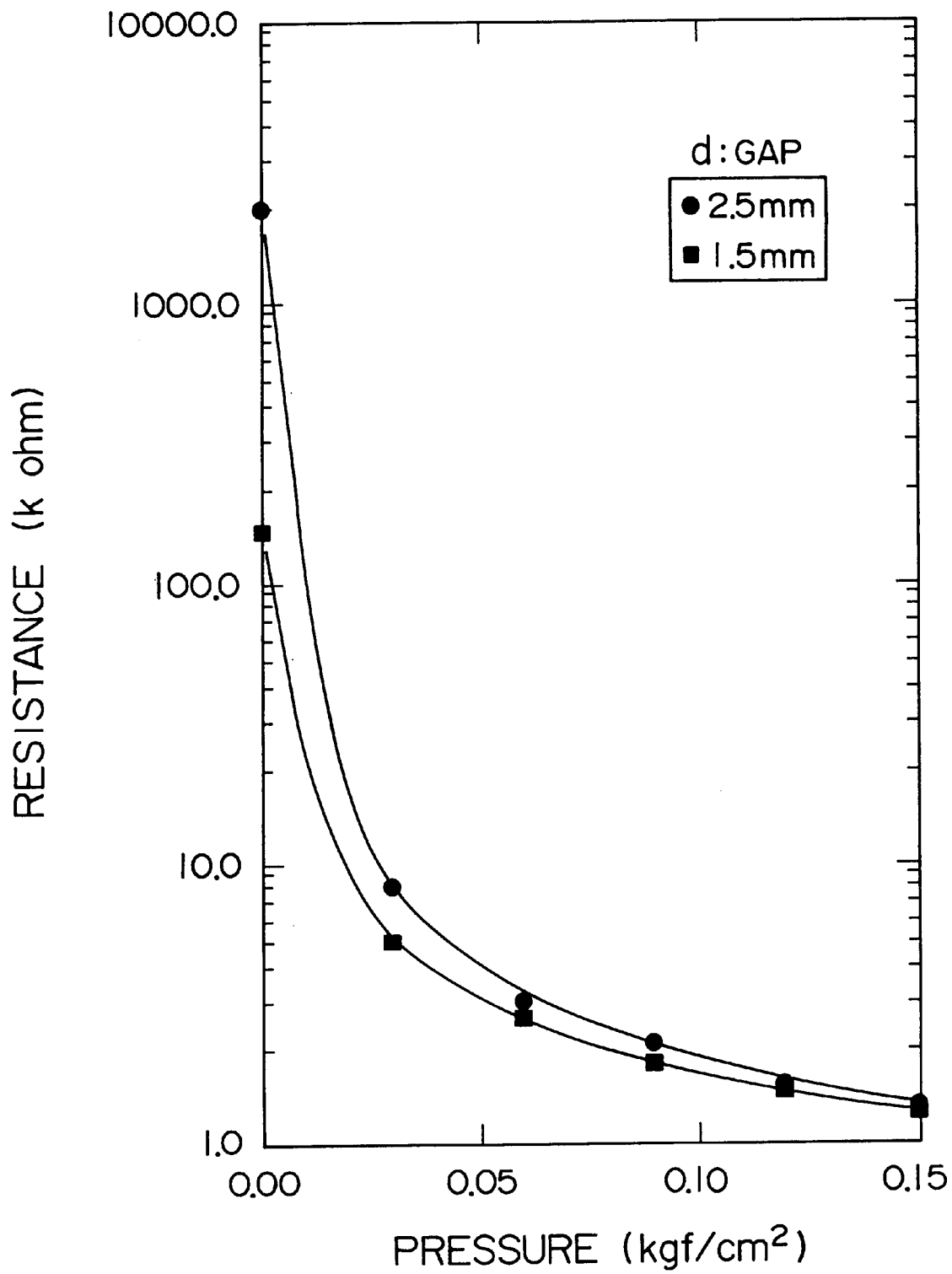
FIG. 5 is a graph showing the influence of the gap between the electrode patterns upon the resistance-pressure characteristics in Embodiment 1 according to the present invention.

FIG. 1 is a longitudinal sectional view of the principal portion of Embodiment 1, FIG. 2 is an equivalent circuit diagram of Embodiment 1, FIGS. 3A and 3B show variations of electrode patterns, FIGS. 4A, 4B, 4C and 4D microscopically show the operation of the pressure-sensitive resistor of Embodiment 1, and FIG. 5 is a graph showing the influence of the distance (gap) between the electrode patterns upon the resistance-pressure characteristics in the pressure-sensitive resistor of Embodiment 1.

In Embodiment 1, insulating particles having larger diameters are mixed in the electrode patterns, and no spacer is provided between the insulating substrates.

In FIG. 1, 1 indicates an upper (base) film (insulating substrate), 2 indicates a lower (base) film (insulating substrate), 3 indicates a pressure-sensitive conductor (resistor member), a1 and a2 indicate first electrode patterns, b1 and b2 indicate second electrode patterns, and d indicates a gap between one of the first electrode patterns and the adjacent second electrode pattern.

The upper film 1 is an insulating film which has a thickness of 75 to 125 $\mu$m, exhibits flexibility, and comprises PET (polyethylene terephthalate) or the like. On the lower surface of this upper film 1, the pressure-sensitive conductor 3 is solidly formed by printing. This pressure-sensitive conductor 3 comprises a conductive film (resistive film) and a large number of insulating particles 4 projecting from the surface of the conductive film, and has a predetermined resistance (approximately 30 to 100 $\Omega$·cm in terms of specific resistance) in directions along the surface of the pressure-sensitive conductor 3 itself.

The pressure-sensitive conductor 3 can be formed, for example, as follows: Insulating glass particles 4 having diameters of 10 to 12 $\mu$m are admixed in an organic solvent together with a conductive (resistive) material such as carbon black and carbon graphite, and a binder such as a phenol resin, to prepare an ink; and this ink is then subjected to screen printing to form a coat of 12 to 15 $\mu$m thickness on the upper film 1, and succeedingly baked.

Through such a baking treatment (heat treatment), the solvent volatilizes, the coat is dried to be thinner, and insulating glass particles 4 project from the surface of the dried ink-coat at degrees of 2 to 5 $\mu$m. Incidentally, since materials other than the glass particles 4 are extremely finer than the glass particles 4, such materials do not project from the surface of the coat.

Further, the resistance (specific resistance) of the pressure-sensitive conductor 3 in directions along its surface can be adjusted according to the mixing ratio of the added materials. Meanwhile, the pressure-sensitive characteristics can be adjusted according to the gap d, the content of the insulating particles 4 (preferably, 5 to 45% by volume), and the amount of the projecting portions of the particles.

Moreover, when the pressure-sensitive conductor 3 is formed through a several printing steps and an ink including insulating particles 4 is used only in the final printing step, the coat thickness can be accurately adjusted and made regular throughout the coat, and the amount of the projecting portions of the insulating particles 4 can also be accurately adjusted. This method can be applied to the cases where the insulating particles 4 have diameters of approximately 2 to 20 $\mu$m, though it is suitable for the cases where the particle diameters are as small as a few $\mu$m.

Although the lower film 2 can also be an insulating film comprising PET or the like and having a thickness similar to the upper film 1, it does not necessarily have to be flexible. Depending on the purpose of the pressure sensitive resistor, a reinforcing sheet harder than the lower film 2, such as a metallic sheet or a synthetic resin substrate, may be disposed under the lower film 2.

On the upper surface of the lower film 2, first electrode patterns a1 and a2 and second electrode patterns b1 and b2 are formed at regular gaps d. Various shapes can be considered for the first and second electrode patterns a and b (hereinafter, when the first and second electrode patterns can be illustrated without considering them as separated patterns a1, a2, . . . , and b1, b2, . . . , respectively, they are generically referred to as first electrode pattern a and second electrode pattern b, respectively). For example, they may be formed in the double spiral shape at a regular interval as shown in FIG. 3A. Alternatively, they may be formed in the shape of a pair of combs having teeth a1, a2 and a3, and b1, b2 and b3, respectively, as shown in FIG. 3B. Further, although not illustrated, they may be formed in the double spiral shape in which the interval therebetween becomes wider toward the outside.

In this embodiment, silver is used for these electrode patterns a and b, and the specific resistance of each pattern is, for example, approximately 0.2 to 2 $\Omega$·cm, which is extremely smaller than the resistance of the pressure-sensitive conductor 3 formed on the upper film 1. Further, similar to the pressure-sensitive conductor 3, insulating particles 4 project from the surfaces of the electrode patterns a and b at degrees of 2 to 5 $\mu$m.

The first and second electrode patterns a and b can be simultaneously formed by screen printing similar to the pressure-sensitive conductor 3, except that the ink used for printing the electrode patterns a and b contains silver powder instead of carbon black or carbon graphite. Nevertheless, for preventing silver from corroding, the ink may contain carbon at a content with which the conductivity of the electrode patterns a and b is not affected. Alternatively, anticorrosive carbon patterns may be formed on the silver electrode patterns by printing, wherein the insulating particles 4 are contained only in the ink used for printing the carbon patterns.

In this embodiment, the width of each of the electrode patterns a and b is 1.4 mm, and the pressure-sensitive characteristics of the resistor are adjusted by adjusting the width of the gap d. The width of the gap d is determined depending on the purpose of the pressure-sensitive resistor, though the preferred value falls in the order of mm.

Additionally, in Embodiment 1, the electrode patterns a and b are led to an edge portion of the lower film 2, and the resistance value is output from the edge portion, though not shown. As occasion demands, the edge portion is connected to a connector.

The thus-composed lower film 2 and upper film 1 are laminated such that the pressure-sensitive conductor 3 oppositely faces the electrode patterns a and b as shown in FIG. 1, thus obtaining a pressure-sensitive resistor.

When pressures are applied to the resistor from above the upper film 1, the resistance between the first and second electrode patterns a and b changes as shown in FIG. 5.

The equivalent circuit of the structure shown in FIG. 1 is shown in FIG. 2 in which the number of each of the first and second electrode patterns a and b is restricted to two for easy understanding.

In FIG. 2, $Ra_n b_m$ indicates the resistance (electrical resistance) between the electrode patterns $a_n$ and $b_m$, $R_c a_n$ indicates the contact resistance between the electrode pattern $a_n$ and the pressure-sensitive conductor, and $R_c b_m$ indicates the contact resistance between the electrode pattern $b_m$ and the pressure-sensitive conductor (herein, each of n and m is 1 or 2). Incidentally, the electrical resistances of the electrode patterns are omitted from the equivalent circuit since they are sufficiently lower than the electrical resistance of the pressure-sensitive conductor.

In the equivalent circuit shown in FIG. 2, $R_ca1$, $R_cb1$ and the like indicate contact resistances as is obvious from FIG. 4, and ideally, they alter between infinity and zero in response to applied pressure. Further, Ra1b1 is the electrical resistance of the pressure-sensitive conductor 3 between the electrode patterns a1 and b1, and it is in proportion to the width of the gap d and does not alter in response to applied pressure when the width of the gap d is constant. The contact resistances and the electrical resistances indicated with the other numerals in FIG. 2 have properties similar to the electrical resistance of the pressure-sensitive conductor 3. Incidentally, the electrical resistance (conductive resistance) of the pressure-sensitive conductor 3 also alters according to the specific resistance thereof.

FIG. 5 shows the resistance-pressure characteristics of samples in each of which the thickness of each of the pressure-sensitive conductor 3 and electrode patterns a and b is 7 to 10 $\mu$m, the average diameter of the insulating particles 4 is 10 to 12 $\mu$m, the insulating-particle content (the volume ratio of the particles to the solid ingredients in the coat) in each of the pressure-sensitive conductor 3 and the electrode patterns a and b is 26.2% by volume, the sheet resistance of the pressure-sensitive conductor 3 having the above-described thickness is 60 k$\Omega$/square (this value corresponds to 60 $\Omega$·cm in terms of specific resistance when the thickness is assumed as 10 $\mu$m), and the width of each of the electrode patterns is 1.4 mm. The data of the sample in which the width of the gap d is 2.5 mm is indicated by the curve having solid circular dots, and the data of the sample in which the width is 1.5 mm is indicated by the curve having solid square dots. The vertical axis is the resistance (k$\Omega$) between the first electrode pattern a and the second electrode pattern b, and the horizontal axis is the pressure (kgf/cm$^2$) applied onto the upper film 1.

As is obvious from FIG. 5, when the applied pressures are the same, the resistance of a sample having a narrower width of the gap d is lower than that of a sample having a wider width of the gap d. The difference in resistance, however, tends to be smaller when the applied pressure is higher. Theoretically, under the condition that the pressure is infinity, the difference in the resistance of the sample comprises only the difference in the resistance of the pressure-sensitive conductors 3 between he electrode patterns a and b when the contact resistances are zero.

Incidentally, in Embodiment 1 the electrode patterns a and b were formed in the double spiral shape as shown in FIG. 3A, the size of which was approximately 25 mm square, and samples in accordance with these specifications were examined in respect of resistance-pressure characteristics. Since the specific resistances of the electrode patterns a and b were extremely smaller than the resistance of the pressure-sensitive conductor 3, the influence of the sizes and the specific resistances of the electrode patterns a and b upon the pressure-sensitive characteristics was small and negligible. In other words, such pressure-sensitive characteristics can be regarded as a function of the width of the gap d.

The mechanism achieving the characteristics as shown in FIG. 5 can be explained as follows with reference to FIGS. 4A to 4D, which are enlarged views showing only one electrode pattern a1 among the electrode patterns a1, a2, b1 and b2. Initially, when viewed microscopically, the pressure-sensitive conductor 3 and the electrode pattern a1 are separated by the insulating particles 4 (FIG. 4A). When the upper film 1 is pressed from above, the conductor 3 and the pattern a1 come into close contact with each other gradually as shown in FIG. 4B, FIG. 4C and FIG. 4D. In summary, the contact area between the electrode pattern a1 and the pressure-sensitive conductor 3 is enlarged by pressure (the application of pressure), and the contact resistance is thereby decreased.

As described above, in Embodiment 1 (also in Embodiments 2 and 3 described below), which has the first and second electrode patterns a and b on one surface, the first and second electrode patterns a and b readily come into areal contact with the pressure-sensitive conductor 3. Accordingly, the insulating particles 4 securely function, and advantageously, neat (theoretical) pressure-sensitive characteristics can be readily obtained.

Incidentally, although the pressure-sensitive conductor 3 in Embodiment 1 can come into contact with the electrode patterns a and b even in a non-operating state, a spacer may be provided therebetween as in Embodiment 2 below such that the pressure-sensitive conductor 3 is essentially separated from the electrode patterns a and b in a non-operating state.

Further, the electrode patterns may be formed without glass particles. In this case, the above-described pressure-sensitive characteristics are achieved only by the insulating particles projecting from the pressure-sensitive conductor.

Moreover, the insulating particles are not limited to glass particles, and ceramic particles or the like can also be used. The diameters of the insulating particles are determined depending on the desired pressure-sensitive characteristics, though 20 $\mu$m or smaller is preferred in consideration of suitability for printing. Additionally, the particles can be fibrous, columnar and irregular-shaped as well as spherical, though spherical particles are preferred since the amount of the projecting portions can be most readily controlled.

Embodiment 2

Next, Embodiment 2 according to the present invention will be illustrated with reference to FIGS. 6 and 7.

Figure 6:
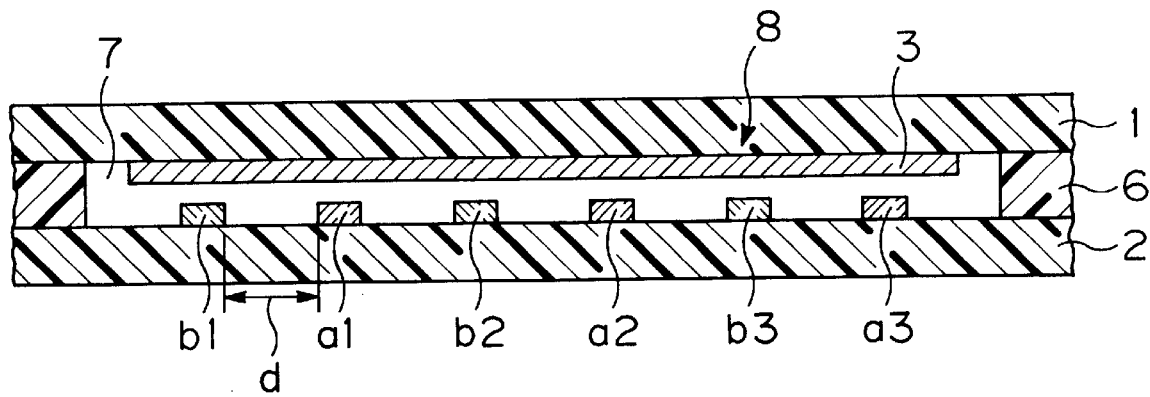
FIG. 6 is a longitudinal sectional view of the principal portion of Embodiment 2 according to the present invention.
Figure 7:
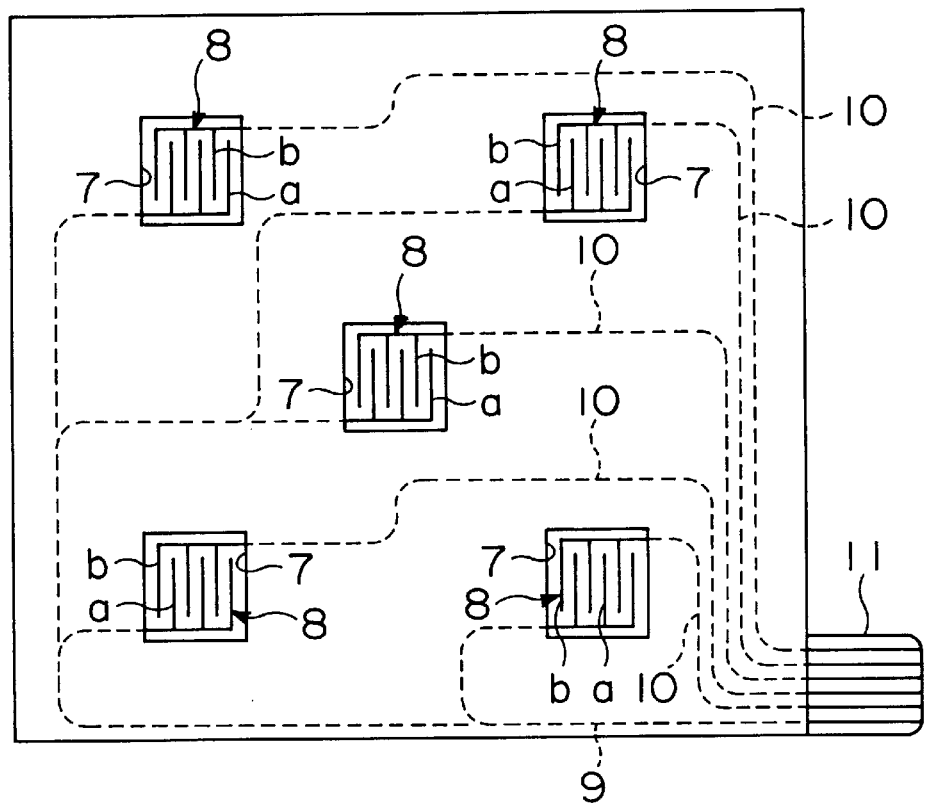
FIG. 7 is a plan view of Embodiment 2 according to the present invention.

FIG. 6 is a longitudinal sectional view of the principal portion of Embodiment 2, and FIG. 7 is a plan view of Embodiment 2 when the upper film is removed.

Embodiment 2 is different from Embodiment 1 principally in the following points. Incidentally, the same components as those in Embodiment 1 are indicated by the same numerals, and a detailed illustration of them has been omitted.

In Embodiment 2, each of the first electrode patterns a (a1, a2 and a3) and the second electrode patterns b (b1, b2 and b3) is a pressure-sensitive conductor having a specific resistance in directions along its surface (pattern), and contains insulating particles 4 (not illustrated) projecting from the surface. Further, the electrode patterns a and b are situated in an opening 7 of a spacer 6, and oppose a pressure-sensitive conductor 3 formed on the lower surface of an upper film 1.

More specifically, in Embodiment 2, pressure-sensitive conductors having almost the same specific resistances as that of the pressure-sensitive conductor 3 printed on the upper film 1 are used for the electrode patterns a and b which are simultaneously formed on the lower film 2 by printing.

Five sets of electrode patterns a and b and pressure-sensitive conductor 3 are dispersively arranged on a plane such that the electrode patterns oppose the corresponding pressure-sensitive conductor. As a result, five pressure-sensitive modules 8 are composed in the pressure-sensitive resistor, and the resistor can detect pressure distribution.

The first electrode patterns a of the five pressure-sensitive modules 8 are connected to a common wiring pattern 9, and the second electrode patterns b are respectively connected to individual wiring patterns 10. The total of six wiring patterns 9 and 10 are extended to an output portion (connector portion) 11. Incidentally, the wiring patterns 9 and 10 can be formed by simultaneously printing them together with the electrode patterns a and b.

Further, a spacer 6 having five openings 7 respectively corresponding to the pressure-sensitive modules 8 is disposed between the upper film 1 and lower film 2. In each opening 7 of the spacer 6 (in each pressure-sensitive module 8), a pressure-sensitive conductor 3 is securely separated from the electrode patterns a and b in a non-operating state, and opposes these electrode patterns.

The spacer 6 may comprise a flexible insulating film of PET or the like, and may have a thickness of 50 to 100 $\mu$m. Alternatively, it may comprise a resist layer print-formed on at least one of the upper film 1 and the lower film 2, and may have a thickness of approximately 10 to 50 $\mu$m. When an insulating film is formed, the upper film, the insulating film and the lower film are made into a laminate using non-illustrated adhesive or adhesive double coated tape. When a resist layer is formed, also, the upper film 1 and the lower film 2 are made into a laminate by a non-illustrated means such as adhesive or adhesive double coated tape.

Each pressure-sensitive conductor 3 is formed on the upper film 1 by solid printing, and has a size which is larger than the total area of the corresponding electrode patterns a and b, but falls within the corresponding opening 7 of the spacer 6. Accordingly, adherence between the upper film 1 and spacer 6 can be raised, and the pressure-sensitive conductors 3 can be prevented from being dragged by adhesive or the like to peel away from the upper film 1 even if an undesired pressure is applied. Considering that the insulating particles 4 (not illustrated) project from the surfaces of the pressure-sensitive conductors 3, the adherence-raising effect is more marked.

Incidentally, those features other than the above are basically the same as those of Embodiment 1.

More specifically, the thicknesses and the materials of the pressure-sensitive conductors (including the conductors as the materials of the electrode patterns) are the same as those of Embodiment 1. Further, although the materials of the electrode patterns a and b are the same as that of the pressure-sensitive conductors 3 and different from those in Embodiment 1, the size and thickness of them is the same as those in Embodiment 1. Accordingly, also in Embodiment 2, similar to Embodiment 1 illustrated with reference to FIGS. 4A to 4D, when a pressure is applied, the insulating particles 4 initially come into contact with one another, then the contact areas between the electrode patterns a or b and pressure-sensitive conductors 3 gradually become large, as shown in FIG. 4D. Further, the resistances between the common wiring pattern 9 and the individual wiring patterns 10 become smaller when the applied pressure is increased.

Incidentally, the shape of the electrode patterns a and b is not limited to the shape of a pair of combs as shown in FIG. 7, and they may be in a double spiral shape as in Embodiment 1.

In Embodiments 1 and 2 above, each pressure-sensitive resistor comprises two insulating substrates 1 and 2 which are oppositely disposed with the intervention of a pressure-sensitive conductor (resistor member) 3 including insulating particles 4 projecting from the conductor's surface, at least one of said insulating substrates being flexible, and two electrode patterns a and b which are formed on one of the opposing surfaces of said insulating substrates 1 and 2 so as not to overlap with each other in plan view, each of said electrode patterns a and b comprising a base conductive film and insulating particles 4 projecting from the conductive film. Due to such a structure, desired pressure-sensitive characteristics of the pressure-sensitive resistor can readily be achieved not only by adjusting the degree of the planar-positional difference (gap d) between said two electrode patterns a and b, but also by adjusting the amount of projecting portions of insulating particles 4 projecting from the pressure-sensitive conductor 3 or the electrode patterns a and b. Accordingly, possible variations for the pressure-sensitive characteristics can be markedly increased. Additionally, since both of the two electrode patterns a and b are formed on one insulating substrate 2, the manufacturing process can be simplified as compared to the case where the electrode patterns are formed on the two insulating substrates one by one.

Further, since both of the two electrode patterns a and b are simultaneously formed by printing on one insulating substrate 2, the degree of the planar-positional difference (gap d) between said two electrode patterns a and b is determined depending on the accuracy of the mask used for the printing. In a case where electrode patterns a and b are formed on different insulating substrates 1 and 2, respectively, and the insulating substrates 1 and 2 are then laminated, as Embodiment 4 below, the degree of the planar-positional difference (d) deviates from a desired level during the laminating (assembling) step, and as a result, the manufactured pressure-sensitive resistors have irregular pressure-sensitive characteristics. In contrast, in a case where electrode patterns are simultaneously formed on one substrate, as in Embodiments 1 and 2 above, irregularities in pressure-sensitive characteristics due to deviations in the degree of the planar-positional difference can be restricted even if a large number of pressure-sensitive resistors are manufactured.

Moreover, in Embodiment 2, since the two insulating substrate 1 and 2 are laminated at an interval, the pressure-sensitive resistor can exhibit a switching function to monitor whether a predetermined load is applied or not.

Furthermore, since a plurality of pressure-sensitive modules 8 including electrode patterns a and b are dispersively disposed, the pressure-sensitive resistor of Embodiment 2 can detect pressure distributions.

Embodiment 3

Next, Embodiment 3 according to the present invention will be illustrated below with reference to FIG. 8.

Figure 8:
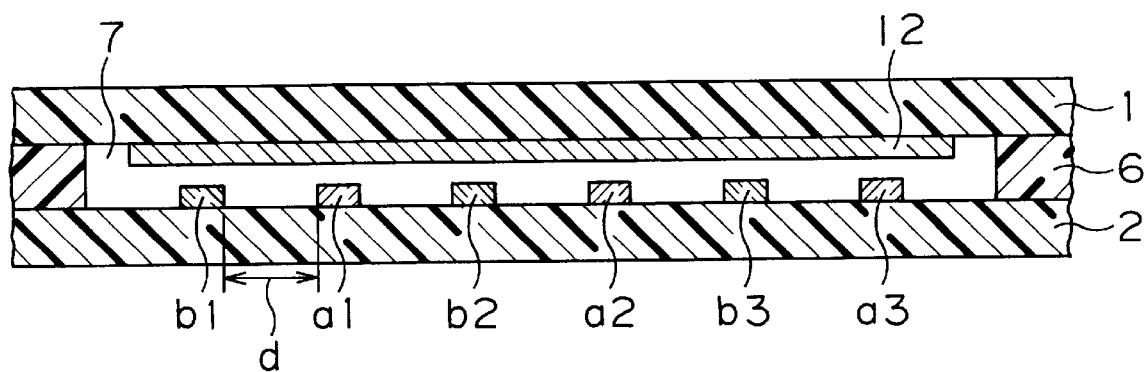
FIG. 8 is a longitudinal sectional view of the principal portion of Embodiment 3 according to the present invention.

FIG. 8 is a longitudinal sectional view of the principal portion of Embodiment 3. Incidentally, the same components as those in Embodiment 2 are indicated by the same numerals, and a detailed illustration of them has been omitted.

The pressure-sensitive resistor of Embodiment 3 is different from that of Embodiment 2 in that it includes a resistor member (resistive element) 12 on the upper film 1 instead of the pressure-sensitive conductor 3, the resister member being an ordinary printed resistive element without large insulating particles.

Also in Embodiment 3, similar to Embodiment 2 above, the electrode patterns a and b themselves have predetermined resistance in directions along their surfaces, and include insulating particles 4 projecting from their surfaces. Due to the existence of the insulating particles 4 (not illustrated), the contacting conditions (contact resistance) between the electrodes and the resistor member 12 can be altered in response to the applied pressure, and the desired pressure-sensitive characteristics can be achieved. Incidentally, the first electrode patterns a (a1, a2 and a3) and the second electrode patterns b (b1, b2 and b3) are simultaneously formed on the lower film 2 by printing.

The resistor member 12 formed on the upper film 1 has a thickness of 7 to 10 $\mu$m, and a specific resistance which is determined depending on the desired pressure-sensitive characteristics, though ordinary values for printed resistor members fall within approximately 40 to 100 Ω·cm.

Incidentally, the specific resistances of the electrode patterns a and b in directions along their surfaces do not have to be similar to that of the resistor member 12 formed on the upper film 1. For example, the electrode patterns a and b may be silver patterns which have specific resistances extremely smaller than the resistance of the resistor member 12, and include insulating particles projecting from the surfaces of the silver patterns, as in Embodiment 1.

Further, similar to Embodiment 2, a spacer 6 is also provided in Embodiment 3.

In Embodiment 3, effects similar to those in Embodiment 2 can be obtained, though possible variations for the pressure-sensitive characteristics are restricted as compared to Embodiments 1 and 2 above since the resistor member 12 does not contain insulating particles. Such restriction does not matter for practical uses since the desired pressure-sensitive characteristics can be satisfactorily achieved by adjusting the amount of the projecting portion or the content of the insulating particles 4 contained in the electrode patterns a and b.

Embodiment 4

Next, Embodiment 4 according to the present invention will be illustrated below with reference to FIGS. 9 and 10.

Figure 9:
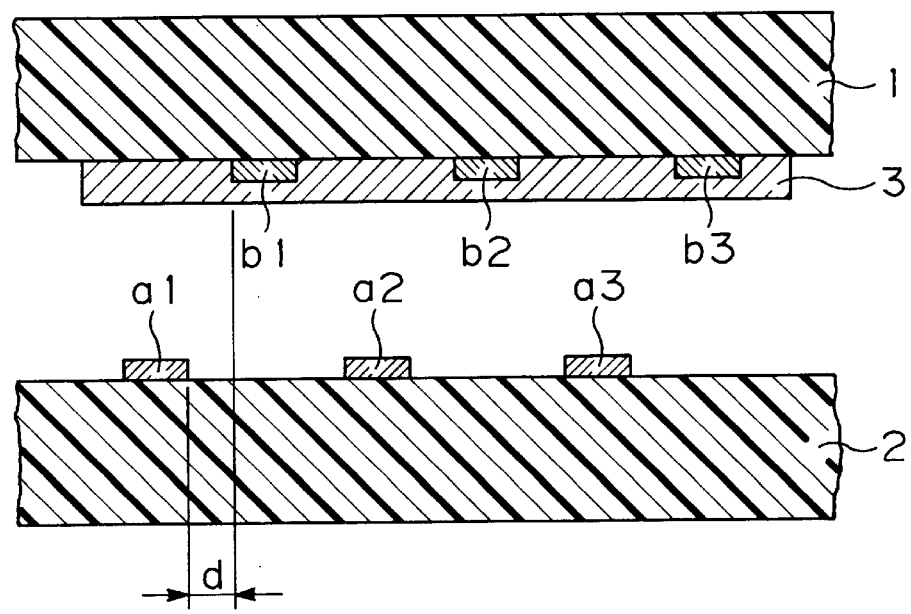
FIG. 9 is a longitudinal sectional view of the principal portion of Embodiment 4 according to the present invention.
Figure 10:
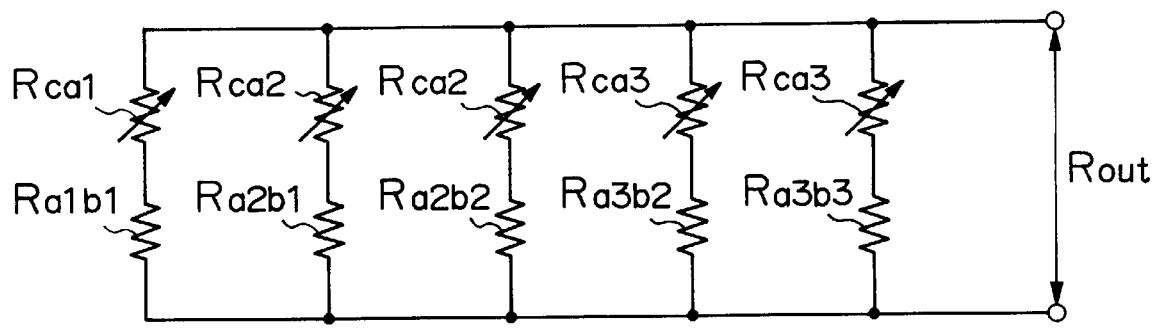
FIG. 10 is an equivalent circuit diagram of Embodiment 4 according to the present invention.
Figure 11:
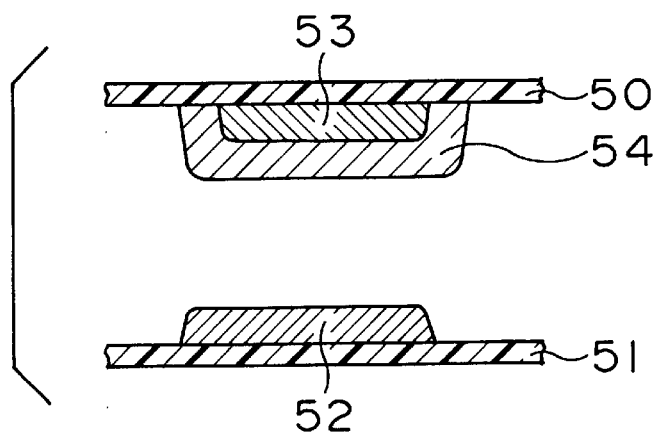
FIG. 11 is a diagram showing an example of a conventional pressure-sensitive resistor.

FIG. 9 is a longitudinal sectional view of the principal portion of Embodiment 4, and FIG. 10 is an equivalent circuit diagram of Embodiment 4. Incidentally, the same components as those in the above-illustrated embodiments are indicated by the same numerals, and a detailed illustration of them has been omitted.

In Embodiment 4, electrode patterns a and b are formed on an upper film 1 and a lower film 2, respectively, so as not to overlap with each other in plan view, and a pressure-sensitive conductor 3 is formed on one of the electrode patterns a and b. Further, a non-illustrated spacer 6 is also provided in the pressure-sensitive resistor of Embodiment 4.

The principal and most marked difference between Embodiment 4 and the other above-illustrated embodiments is that the pressure-sensitive resistor of Embodiment 4 includes a set of electrode patterns a1, a2 and a3 and a set of electrode patterns b1, b2 and b3 formed on the upper film 1 and the lower film 2, respectively, and both sets of electrode patterns a1 to a3 and b1 to b3 are formed by printing using silver so as not to overlap with each other in plan view (in the shape of a pair of combs or spirals).

The electrode (silver) patterns a1 to a3 formed on the lower film 2 are the same as those in Embodiment 1. More specifically, each thickness is 7 to 10 μm, and insulating particles 4 (not illustrated) project from the surfaces. The specific resistances are also the same as those in Embodiment 1, and carbon may be added for anticorrosion.

The electrode patterns b1 to b3 (second electrode patterns) formed on the upper film 1 are different from the electrode patterns a1 to a3 (first electrode patterns) formed on the lower film 2 only in that they do not contain insulating particles. Adding insulating particles to the electrode patterns b1 to b3 formed on the upper film 1 is not significant since the pressure-sensitive conductor 3 is printed on the electrode patterns b1 to b3.

The pressure-sensitive conductor 3 is formed by solid printing so as to cover the electrode patterns b1 to b3 on the upper film 1, and has the same features as the pressure-sensitive conductor in Embodiment 1. More specifically, the pressure-sensitive conductor 3 has a thickness of 7 to 10 μm and a specific resistance of approximately 60 Ω·cm. As to the forming method, silver patterns are printed and baked, and then processed into second electrode patterns b1 to b3 according to the same manner as in Embodiment 1.

As is obvious from the fact that such a forming method is employed, the pressure-sensitive conductor 3 actually has a surface irregularity due to the existence of the electrode patterns b1 to b3, though it is drawn as if having a flat surface in FIG. 9. More specifically, the portions on the electrode patterns b1 to b3 protrude as compared to the portions directly formed on the upper film 1. Further, the first electrode patterns a1 to a3 on the lower film 2 are disposed so as to oppose the non-protruding portions between the protruding portions of the pressure-sensitive conductor 3. According to this structure, the edge portions of the first electrode patterns a1 to a3 may more readily come to contact with the pressure-sensitive conductor 3 than the upper surfaces of the electrode patterns. As a result, when a pressure is applied and the first electrode patterns come into contact with the pressure-sensitive conductor 3, the insulating particles 4 may insufficiently function, and possibly, neat pressure-sensitive characteristics as shown in FIG. 5 can be rarely obtained.

Such problems can, however, be solved by providing a resistor layer (an intermediate layer) between the second electrode patterns b1 to b3 and the pressure-sensitive conductor 3. The intermediate layer is formed by printing without insulating particles 4, has a thickness of 10 to 20 μm, and makes the surface of the pressure-sensitive conductor 3 flatter to achieve neat pressure-sensitive characteristics. In this case, preferably, the specific resistances of both the pressure-sensitive conductor 3 and the intermediate layer fall within 180 to 200 Ω·cm.

In FIG. 10 showing the equivalent circuit of the pressure-sensitive resistor of Embodiment 4, $Ra_n b_m$ indicates the electrical resistance of the pressure-sensitive conductor 3 between the electrode patterns $a_n$ and $b_m$, and $R_c a_n$ indicates the contact resistance between the electrode pattern $a_n$ and the pressure-sensitive conductor 3 (herein, each of n and m is 1, 2 or 3).

Incidentally, the electrical resistances of the electrode patterns are not illustrated (regarded as 0 Ω) in the equivalent circuit diagram of FIG. 10 since they are sufficiently smaller than the resistance of the pressure-sensitive conductor 3. More strictly, electrical resistances also exist between the electrode pattern a1 and the electrode pattern b2, and between the electrode pattern a1 and the electrode pattern b3. The electrode patterns b1, b2 and b3, however, have extremely small specific resistances and are substantially conductively connected. Accordingly, as to the electrode pattern a1, it is sufficient to consider the electrical resistance between the electrode pattern a1 and the electrode pattern b1 which is closest to the electrode pattern a1, and the electrical resistances between the electrode patterns a1 and b2 and between a1 and b3 have been neglected for simple illustration. In other words, when the specific resistances of the electrode patterns are extremely smaller than the resistance of the pressure-sensitive conductor so as to be negligible, the entire electrical resistance between an electrode pattern and the opposing electrode patterns substantially equals the electrical resistance between the electrode pattern and the closest opposing electrode pattern. Accordingly, the entire electrical resistance between the electrode pattern a and the electrode patterns b1, b2 and b3 can be regarded as the electrical resistance between the electrode patterns a1 and b1. Similarly, the electrical resistances between the electrode patterns a2 and b3 and between a3 and b1 can be neglected, and are not illustrated in the equivalent circuit diagram.

Also in the pressure-sensitive resistor of Embodiment 4, the contact resistance between the pressure-sensitive conductor 3 and each of the electrode patterns a1 to a3 becomes smaller relative to an increase in pressure applied to the upper film 1, and the resistance ($R_{out}$) between the electrode patterns a and b also gradually becomes smaller. When the applied pressures are the same, the resistance ($R_{out}$) of a pressure-sensitive resistor having narrower gaps d is smaller than the resistance of a pressure-sensitive resistor having wider gaps d, though the difference in resistance decreases relative to an increase in the applied pressure, similar to the case shown in FIG. 5.

Incidentally, the insulating particles 4 in the first electrode patterns (silver patterns) a1 to a3 on the lower film 2 do not have to project from their surfaces, and the desired pressure-sensitive characteristics can be achieved based on the insulating particles 4 included in and projecting from the pressure-sensitive conductor 3 on the upper film 1.

Additionally, a pressure-sensitive conductor 3 similar to that on the upper film 1 may be provided on the first electrode patterns a1 to a3 on the lower film 2.

In each of the above-illustrated embodiments, the structures on the upper film 1 and the lower film 2 may be exchanged with each other.

Further, the pressure-sensitive conductor is not limited to the above-illustrated types. For example, it may be formed with an insulating elastomer such as silicone rubber or butyl rubber and a large amount of conductive particles such as a metal or carbon dispersed therein so as to exhibit predetermined resistance in directions along its surface in a non-pressing state, and the contacting state (contact resistance) between the thus-formed pressure-sensitive conductor elastomer (rubber) and electrode patterns is made to alter according to the application of pressure. In this case, in addition to alteration in the contact resistance, the resistance of the pressure-sensitive conductor elastomer in the direction of its thickness also alters, and the resistances between the electrode patterns also decreases in relation to an increase in the applied pressure.

Advantages of the Above-illustrated Embodiments

In each of the above-illustrated Embodiments 1, 2 and 4, the pressure-sensitive resistor comprises two oppositely disposed insulating substrates 1 and 2, at least one pressure-sensitive conductor 3 which is disposed between the insulating substrates 1 and 2 and has a predetermined resistance in directions along the surfaces of the insulating substrates, and at least two electrode patterns a and b formed on at least one of the opposing surfaces of the insulating substrates 1 and 2 so as not to overlap with each other in plan view. According to this structure, the pressure-sensitive characteristics of the resistor can be adjusted by adjusting the degree of the planar-positional difference (gap d) between the electrode patterns a and b, namely, the desired pressure-sensitive characteristics can be readily achieved by appropriately designing the electrode patterns a and b.

Further, in each of the above-illustrated Embodiments 1, 2 and 4, at least one of the insulating substrates 1 and 2 is flexible, at least one pressure-sensitive conductor 3 is formed on at least one of the insulating substrate 1 and 2, said at least one of the insulating substrate 1 and 2 opposing the other insulating substrate on which the electrode patterns a and b are formed, and the pressure-sensitive conductor 3 comprises a base conductive film (layer) and insulating particles 4 projecting from the conductive film. According to this structure, the pressure-sensitive characteristics of the pressure-sensitive resistor can be adjusted not only by adjusting the degree of the planar-positional difference (d) between the electrode patterns a and b, but also by adjusting the amount of the projecting portions of the insulating particles 4. The possible variations for the pressure-sensitive characteristics can, therefore, be readily markedly increased.

Moreover, in each of Embodiments 1 and 2, both of the electrode patterns a and b are formed on one of the opposing surfaces of the insulating substrates 1 and 2, and each of the electrode patterns comprises a conductive film (layer) and insulating particles 4 projecting from the surface of the film. According to this structure, the manufacturing process can be simplified as compared to the cases where electrode patterns are formed on both insulating substrates 1 and 2 one by one. Further, since the electrode patterns a and b and the pressure-sensitive conductor 3 include insulating particles 4 projecting from the conductive films as the bases of the patterns and conductor, the number of parameters concerning the pressure-sensitive characteristics can be increased. In particular, the degree of freedom in selecting the pressure-sensitive characteristics of the resistor in an early stage of an application of pressure can be increased since the desired pressure-sensitive characteristics can also be achieved by respectively adjusting the amounts of the projecting portions of the insulating particles in the patterns and the conductor.

Furthermore, in each of Embodiments 1 to 3, the two electrode patterns a and b are simultaneously formed on one of the opposing surfaces of the insulating substrates 1 and 2, and the degree of the planar-positional difference (d) between said two electrode patterns a and b is determined, for example, depending on the accuracy of the mask used for the printing. Accordingly, the degree of the planar-positional difference (d) is not altered during assembly of the resistor, and deviation in pressure-sensitive characteristics between manufactured pressure-sensitive resistors can be restricted.

Moreover, in Embodiment 3, a resistor member 12 is formed on the flexible insulating substrate 1, the resistor member 12 opposes the two electrode patterns a and b which are formed on the insulating substrate 2 so as not to overlap with each other in plan view, and the electrode patterns a and b contain insulating particles 4 projecting from their surfaces. According to this structure, the pressure-sensitive characteristics of the pressure-sensitive resistor can be adjusted based on the state of the insulating particles and the degree of the positional difference (d) between the electrode patterns a and b, and the process for manufacturing the electrode patterns a and b can be simplified.

Additionally, in each of the embodiments above, the diameters of the insulating particles 4 are larger than the thickness of the conductive film where the insulating particles 4 are embedded, and each conductive film is formed by printing. Accordingly, since each conductive film can be formed by a simple method such as printing, the productivity of the pressure-sensitive resistors can be improved.

What is claimed is:

1. A pressure-sensitive resistor comprising:
two insulating substrates, each of which has an opposing surface facing the other substrate, and at least one of which is flexible;
at least one pressure-sensitive module which comprises a pressure-sensitive conductor disposed between said insulating substrates and having a predetermined electrical resistance in directions along the surfaces of said insulating substrates, and two electrode patterns situated between at least one of said insulating substrates and said pressure-sensitive conductor,
wherein said two electrode patterns are formed on at least one of the opposing surfaces of said two insulating substrates so as not to overlap with each other in plan view, and said two electrode patterns are formed on the opposing surfaces of said insulating substrates one by one; and wherein said pressure-sensitive conductor is formed on at least one of said two insulating substrates where said electrode patterns are formed, said pressure-sensitive conductor comprises a base conductive film and insulating particles projecting from the film; and said pressure-sensitive conductor comprises a conductive film formed by mixing carbon in a binder and insulating particles protecting from the conductive film.

2. The pressure-sensitive resistor according to claim 1, wherein the diameters of said insulating particles are larger than the thickness of said conductive film where the insulating particles are embedded.

3. A pressure-sensitive resistor comprising:

two insulating substrates, each of which has an opposing surface facing the other substrate, and at least one of which is flexible;

at least one pressure-sensitive module which comprises a pressure-sensitive conductor disposed between said insulating substrates and having a predetermined electrical resistance in directions along the surface of said insulating substrates, and two electrode patterns situated between at least one of said insulating substrates and said pressure-sensitive conductor, wherein said two electrode patterns are formed on at least one of the opposing surfaces of said two insulating substrates so as not to overlap with each other in plan view;

said two electrode patterns are formed on the opposing surfaces of one of said two insulating substrates;

said pressure-sensitive conductor is formed on the opposing surface of the other insulating substrate; and said pressure-sensitive conductor comprises a conductive film formed by mixing carbon in a binder and insulating particles projecting from the film.

4. The pressure-sensitive resistor according to claim 3, wherein the diameters of said insulating particles are larger than the thickness of said conductive film where the insulating particles are embedded.

5. The pressure-sensitive resistor according to claim 4, wherein said conductive film is formed by printing using a conductive ink in which insulating particles are dispersed.

6. The pressure-sensitive resistor according to claim 3, wherein each of said two electrode patterns comprises a conductive film and insulating particles projecting from the surface of the film.

7. The pressure-sensitive resistor according to claim 3, wherein said two electrode patterns are simultaneously formed on one of the opposing surfaces of said insulating substrates by printing.

8. The pressure-sensitive resistor according to claim 3, wherein said two insulating substrates are laminated with the intervention of a spacer such that said two electrode patterns oppose said pressure-sensitive conductor at an interval.

9. The pressure-sensitive resistor according to claim 8, wherein said pressure-sensitive resistor has a plurality of dispersively disposed pressure-sensitive modules each comprising said two electrode patterns, and said pressure-sensitive conductor opposing them.

10. A pressure-sensitive resistor comprising:

two insulating substrates, each of which has an opposing surface facing the other substrate, and at least one of which is flexible;

at least one pressure-sensitive module which comprises a resistor member disposed between said insulating substrates, and two electrode patterns formed on one of the opposing surfaces of said two insulating substrates so as not to overlap with each other in plan view;

wherein each of said electrode patterns comprises a base conductive film and insulating particles projecting from the film; and wherein each of said conductive films is formed by printing using a conductive ink in which insulating particles are dispersed.

11. The pressure-sensitive resistor according to claim 10, wherein the diameters of the insulating particles are larger than the thickness of the conductive film where said insulating particles are embedded.

* * * * *

UNITED STATES PATENT AND TRADEMARK OFFICE
CERTIFICATE OF CORRECTION

PATENT NO.    : 5,948,990
DATED         : September 7, 1999
INVENTOR(S)   : Junji Hashida It is certified that error appears in the above-identified patent and that said Letters Patent is hereby corrected as shown below:

Column 15, line 12:

<u>In the Claims</u>

Claim 1, line 25, change "protecting" to --projecting--.

Signed and Sealed this

Eighteenth Day of April, 2000

Attest:

Q. TODD DICKINSON

Attesting Officer

Director of Patents and Trademarks